United States Patent Office 3,330,659

Patented July 11, 1967

3,330,659

PHOTOGRAPHIC PRODUCT AND METHOD OF MAKING SAME

Eugene Wainer, Shaker Heights, Ohio, assignor to Horizons Incorporated, a corporation of New Jersey No Drawing. Filed Jan. 29, 1964, Ser. No. 341,116
21 Claims. (Cl. 96—35.1)

This description relates to novel compositions of matter in dry form from which photographic images are produced as the result of exposure to light with or without subsequent solvent or chemical treatment, said novel compositions of matter consisting of various monomers in combination with active polymers with or without other added agents, said combinations being capable of yielding dry films prior to light exposure which, on exposure to light, produce a high molecular weight polymer either of the copolymer, block, graft, or crosslinked variety or combinations thereof through which formation images of photographically useful character can be achieved. More particularly, these novel compositions of matter comprise a mixture of an active low molecular weight polymeric material made by a specialized polymerization of a vinyl monomer in the presence of an accelerator of polymerization, said accelerator taken from the class of acyloins, combining said specially prepared low molecular weight polymer so prepared with vinyl monomers taken from certain classes in specific amounts, with or without the addition of specialized crosslinking agents, and with or without addition of specialized sensitizers, exposing of this generally described mixture to light under proper conditions, fixing with heat, and thereafter with or without specialized chemical treatment utilizing the images thus produced for the various applications indicated in this specification.

Photopolymerization, in its broad concepts, is enjoying increasing utility in the graphic arts. Photopolymerization and its variations are used for the manufacture of lithographic plates, long run printing plates, preparation of resists for the manufacture of printed circuits by etching processes, manufacture of silk screens for silk screen printing purposes, preparation of templates for loft purposes, preparation of templates as pantograph guides for automatic operation of machine tools, and impression printing by contact for office photocopy purposes as in the dye transfer process. The compositions described in this specification are useful for the above listed and other purposes.

The presently known photoresists of commerce are invariably negative working. This means that polymerization takes place only in the areas exposed to light. Again, invariably, the presently known commercially utilized photoresists achieve their useful properties by a post-treatment in a solvent after exposure involving removal of unexposed portions of the image. The novel compositions of the present invention, on the other hand, provide several new aspects of utility over those presently enjoyed in the field of photopolymerization which, in some case, eliminates the need for the solvent leach post-treatment although in the majority of cases the solvent leach post-treatment is a desirable procedure. For example, some of the novel compositions of this invention make possible the production of images which scatter light so they can be viewed by projection without the need for the solvent treatment. Such projection may comprise visual light with ordinary optics or visual light with Schlieren optics. Further, in addition to the normal utility enjoyed by photoresists generally the novel compositions of this invention are sensitive to electron beams so that images can be produced which can be viewed either visually or may be read out by traversing with an electron beam. Further, the novel compositions of this invention produce images on exposure to X-rays which again can be viewed visually by projection as indicated previously or may be solvent leached and the residual image dyed for permanent record purposes. Finally, and probably most important, the novel photoresist compositions of this invention may be made positive or negative working, at will, simply by manipulation of the relative proportions of the ingredients of the preferred compositions.

It is, therefore, an object of the invention to provide a photopolymerizable system which is useful not only for the usual applications imposed on such photopolymerizable compositions but also for the new applications suitable for such photopolymerizable compositions which were described immediately above. Other objects of the invention will be specifically disclosed or will become apparent from the following background descriptions.

Probably the oldest and still most generally used photoresist composition is the familiar bichromated gelatin. When a mixture of gelatin and certain salts of chromium are exposed to ultraviolet light, the portions exposed to such light become considerably more insoluble in water than those which have not been so exposed and thus the desired image is obtained by washing such a plate in water. The system enjoys utility in the manufacture of silk screens, lithographic plates, certain types of printed circuit work and the like. It suffers from the disadvantage that, photographically speaking, it is very slow and the difference in water solubility is one of degree rather than of kind with the result that lengthy soaking in water will damage and eventually destroy the photoresist images previously produced. Even under the best of conditions the photoresist image available is relatively soft and fragile and is easily damaged. By using dyed gelatin or dyeing after wash off a visible image is produced.

Another photoresist composition of growing utility specifically for photoetch followed by chemical attack methods for the production of printed circuits is based on polyvinyl cinnamate. This unusual polymer has the property that, if the polymer is produced in the absence of ultraviolet light, such as complete darkness or under a yellow safelamp, it will then self crosslink and become insoluble in most solvents on exposure to ultraviolet light. In order to obtain useful results, the surfaces thus produced after exposure to suitable amounts of ultraviolet light, must then be treated with special organic solvents to remove those portions not exposed to light. Again, the system is negative working, is slow photographically speaking, but does produce a hard, tough surface relatively stable against most solvents from which its utility for a combined photo and chemical etch process for the production of printed circuits and specialized chemically etched designs is derived and is thus superior in this regard to the traditional bichromated negative working gelatin system. The principal drawbacks of the polyvinyl cinnamate system are the slow photographic speed, the fact that it is only negative working, the absolute necessity for solvent washing for visualization purposes, and the raw materials are exceptionally expensive.

A third variety of photoresist type photopolymeric materials, also negative working and very slow photographically speaking, are the systems based on photoactive polyamides and utilized principally for the manufacture of long run printing plates developed chiefly by the Time Life organization, see for example U.S. Patent 3,081,168 issued Mar. 12, 1963 and the Du Pont Company. The Du Pont variation is fitted with the trade name "Dycril." These compositions are based on the use of the polyamide nylon 6 or nylon 8 in conjunction with the crosslinking agent such a N,N-methylenebisacrylamide and a light sensitive activator such as benzophenone. On exposure to light, the modified polyamide exhibiting original solubility in water solutions becomes completely insoluble and after proper treatment with a water bearing solvent a very hard, tough resist remains. The material can be exposed in depth in order to give the raised impressions needed for later printing press purposes and the leaching of the unexposed portions generally involve either dilute water solutions of caustic (NaOH) or water solutions of calcium chloride which may or may not contain caustic. As indicated, the system is negative working and is very slow, photographically speaking, so that the extended exposure to an arc lamp is required for full development. A much more serious disadvantage is the fact that the crosslinking is inhibited entirely by the presence of air; in order to make the surfaces useful for the design purposes, the surface must be bathed in an oxygen-free atmosphere such as nitrogen or carbon dioxide for at least 24 hours prior to exposure in order to remove oxygen by diffusion so that the already slow photochemical reaction will not be further inhibited.

In all the systems described in the preceding paragraphs, it is necessary to make the image available for subsequent use by solvent leach procedures. In addition, the normal applications of photopolymeric resists appear to be the only ones available and the difficulties existing in obtaining both positive and negative working systems in the same realm of compositions appear to be great.

It is, therefore, a further group of objects of this invention to provide photographic systems based on the production or modification of systems containing a polymer which can be made both positive and negative working at will; while the novel systems may be utilized through post solvent leach treatments, certain variations yield an opacity which can be viewed by ordinary or Schlieren projection without the need for a solvent leach.

It is a further object of this invention to provide photopolymeric systems in which the polymerization process can be caused to take place by electron beams in which the image can be read out either by electron beams, by visual projection, or through the use of Schlieren optics, or, if desired, may be solvent leached for another modification of access.

It is a further object of the invention to provide processes and compositions sensitive to X-rays which again can be read out without the use of solvent leach or with inclusion of solvent leach if desired.

It is a further object of the invention to provide photopolymerizable systems which yield dry films prior to light exposure.

It is still another object of our invention to provide compositions which may be utilized for photoetch and chemical etch purposes for the production of printed circuits, for the production of both positive and negative working lithographic plates, for the production of silk screens, for the recording of electron beams and X-rays, for the obtaining of images which can be viewed by visual projection, and can be made positive or negative working at will, all of the above at photographic speeds considerably higher than that available from materials of the prior art and all of the above from layers which are dry prior to exposure. Further, the products of this invention, under proper manipulation, are capable of producing materials insoluble in acids and alkalies and in the usual organic solvents without specialized atmosphere treatment prior to exposure. These novel compositions can be applied to a host of surfaces such as metals, glass, ceramics, resin films or may be impregnated into porous webs such as paper for specific applications.

In general, the novel photocompositions of this invention consist of two essential ingredients which may be utilized with or without a third and fourth ingredient if so desired. The first essential ingredient is a low molecular weight polymer of a specific class in which each of the molecules is fitted with a terminal photolabile substituent. The molecular weight of each of the polymer molecules in the group of suitable polymers does not exceed a molecular number of approximately 3000. The second essential constituent of these novel compositions is a vinyl monomer exhibiting little or no vapor pressure at room temperature, only certain of these vinyl monomers being suitable for this invention. While occasionally liquid monomers of very high boiling point are suitable, in general, the deliberately added monomer is solid at room temperature under which conditions it exhibits substantially no vapor pressure and is invariably stable when stored in air but in the absence of ultraviolet light. The third constituent of the compositions to be described, particularly useful when high photographic speeds are desired and when the facility for controlled modification of the positive or negative rendition is desired, is a crosslinking agent generally utilized in very small amounts. Throughout this description, the low molecular weight polymer fitted with a terminal photo labile substitutent will be designated as "a photoactive polymer." The fourth constituent of the compositions to be described is a nitro derivative, specifically a nitro-aryl derivative.

The novel compositions of matter and the methods for producing such novel compositions of matter will now be described in detail.

LOW MOLECULAR WEIGHT POLYMER WITH TERMINAL PHOTOLABILE SUBSTITUENT

The photoactive polymer is produced by an extensive exposure to ultraviolet light of a mixture of a specific type of pure vinyl monomer with an activator of polymerization, said activator being taken from the class of hydroxy ketones known as acyloins or keto alcohols and represented by the general formula:

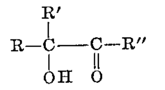

wherein R and R″ are each an alkyl or aryl radical and R′ is H, alkyl or aryl, it being preferred that R″ be aryl. The monomer from which the photoactive polymer is produced is the pure form of a vinyl compound in which a carbonyl substituent is always attached to the 2 carbon of the vinyl substituent. Monomers suitable for this purpose are listed in Table I and for the purposes of this description it appears that the activity of vinyl acetate and methylmethacrylate may be regarded as typical. In general all of the monomers listed in Table I act in similar fashion to vinyl acetate and methylmethacrylatie. The same type of photoactivity is achieved and the same general mechanisms of purification in handling are applicable.

TABLE I.—PHOTOPOLYMERIZABLE MONOMERS FOR PRODUCTION OF ACTIVE "PREPOLYMERS"

(1) Vinyl acetate
(2) Vinyl formate
(3) Methyl methacrylate
(4) Ethyl methacrylate
(5) Methacrylic acid
(6) Ethyl acrylate
(7) Butyl methacrylate
(8) 2-ethyl hexyl acrylate
(9) Methyl vinyl ketone In order to produce the photoactive polymer, the monomer representing the building blocks for the purpose must be utilized in pure form. For the purposes of this purification, techniques well known to those skilled in the art have been found to be satisfactory. Since the monomers of commerce generally contain inhibitors for storage purposes and said inhibitors must be removed prior to the preparation of the photoactive polymer, a generally useful procedure for the desired purification is the low pressure distillation of the monomer under low light level conditions, such distillation taking place in an atmosphere of nitrogen. To prevent premature polymerization of the thermal type which must be prohibited entirely, the temperature of distillation generally should not exceed 45° C. and in order to achieve this relatively low temperature of distillation, pressures of distillation of 30 mm. of mercury or less are utilized. The boiling inhibited monomer, the rectification column, the receiver (or in other words, the entire distillation train) is swept with nitrogen during the purification to prevent the adverse effects of oxygen either as an accelerator or inhibitor of the subsequent polymerization. Immediately after distillation purification, the monomer is mixed with the required amount of specialized polymerization accelerator and finally subjected to the treatment which produces directly the desired photopolymer. Before describing this specialized treatment the nature of the polymerization accelerators will be described since they are of specific character and only certain types are suitable for the purposes defined in our specification.

Only those polymerization accelerators which act as active chain transfer agents are suitable in the present process. This means that when the carbonyl substituted vinyl monomers described in Table I are polymerized under the conditions to be described later in the presence of the specific polymerization accelerators and as a consequence of chain transfer a large number of molecules of relatively low molecular weight are produced and the molecular weight obtained generally has a finite limit as a consequence of the concentration of polymerization accelerator utilized and the time of exposure. The amount of polymerization accelerator utilized and the amount of light is such that the molecular number does not exceed a value of about 3000. In the absence of the specific amount of specific type of polymerization initiator and utilizing roughly the same conditions of polymerization as described in this specification the polymerization may proceed substantially without limit to yield polymers having molecular numbers of the order of $10^5$ to $10^7$. Further, if polymerized in accordance with the description to follow but in the absence of the chain transfer agent, polymerization will continue in the bottle after the initiating force has been removed with the result that the undesired high molecular number systems, inactive for the present purposes, will invariably be obtained on storage if not directly during the initiation process.

Suitable initiators of polymerization for the present invention are listed in Table II. They are properly designated as a chain transfer type of polymerization initiator. It should be noted that all of the initiators listed in Table II are of the acyloin class of compounds in which a carbonyl substituent is adjacent to a carbon containing an hydroxyl substituent. Thus these compounds are in the general class of aryl and alkyl substituted complex ketones. Generally, the amount of chain transfer and the degree of molecular number achieved in the polymerization appears to be a function solely of the amount of ketone substituent present and thus a strict molecular weight relationship exists between the amount of activator utilized and the amount of monomer in the reaction mixture.

TABLE II.—PHOTOINITIATORS FOR PREPARATION OF ACTIVE "PREPOLYMERS"

| Initiator: | Time for removal in first photopolymerization step—Hrs. |
|---|---|
| Benzoin | 20 |
| 2-methyl benzoin | 20 |
| 2-allyl benzoin | 20 |
| 2-phenyl benzoin | 20 |
| Tertiary-butylbenzoin | 30 |
| Toluoin | 30 |
| Acetoin | 45 |
| Butyroin | 50 |
| 3-hydroxy-4-methyl pentanone-2 | 25 |
| 11-hydroxy-12-ketotetracosane | 65 |
| Glycollic aldehyde | 55 |

The relative number of moles suitable for this invention has been found to be between 0.1 and 10 moles of acyloin activator per hundred moles of vinyl monomer. Though it has been stated that the molecular ratio of activator and monomer relative to the molecular amount of carbonyl substituent appears to be a constant and each activator differs only in the rate of polymerization which it exhibits, another variable exists relative to the desired degree of polymerization as a consequence of the activity of the second substituent added to the eventual composition, namely the solid vinyl monomer. As a consequence of the variation in the nature of the second substituent, to be described later, it has been found that optimum ratios of polymerization activator/monomer fall in a range of 1 to 3 moles of activator per hundred moles of purified vinyl monomer. Within the time limits of light exposure which have been established as optimum in formation of the photoactive polymer, the most useful photopolymers for the purposes of my invention exhibit molecular numbers in the range of 1000 to 3000.

A mixture of photoactivator and purified vinyl monomer of the foregoing descriptions is placed in a 1 liter flask fitted with a stirrer. It is generally advisable to carry out the polymerization under an oxygen free atmosphere which is easily accomplished by sweeping the surface with either nitrogen or carbon dioxide. The contents of the flask are kept in a constantly stirring condition and polymerized by exposure to ultraviolet light utilizing a G.E. RS 275 watt sunlamp at a distance of 18" for the purpose and the ultraviolet energy density at the flask is approximately 1.2 milliwatts per square cm. Under these conditions the temperature of the flask will not exceed 30° C. even if the time of polymerization is extended unduly, it being mandatory that such temperature not be exceeded. For added insurance the reaction flask is kept cool by means of a stream of moving air produced by a fan so as to make certain that the temperature throughout the reaction is below 30° C. to prevent undesired thermal polymerization. This requirement is imposed to insure that all of the polymerization is purely ultraviolet light activated and is not thermally activated which defeats the desired purpose. The time of the polymerization campaign to produce the desired "$n$" numbers will vary between 20 and 100 hours of exposure to the ultraviolet lamp previously described, this being time period sufficient to utilize all of the activator for the purposes of producing the low molecular weight active polymer. From the nature in which these active polymers react subsequently as defined in further portions of this specification, it appears that each of the molecules of the polymer is now fitted with a labile terminal photoactive substituent. Under the conditions of preparation the evidence is that the desired photochemical action has reached a final stage and the material is stored in brown bottles until required for use in the final composition.

For purposes of convenience, the material thus prepared may be designated as a photoactive "prepolymer." It is in the form of a viscous syrup and when stored in a brown bottle it is indefinitely stable for its eventual purposes. There are certain significant pecularities surrounding this material. For example, the desired results are obtained only when bulk polymerization techniques are utilized. Little or no utility is obtained when solution or emulsion polymerization methods are utilized.

Secondly, the syrup exhibits its maximum eventual effectiveness when all of the acyloin activator has been consumed in the ultraviolet light initiated polymerization. Such total consumption is established by periodic examination of the syrup as the time of illumination proceeds using a combination of ultraviolet and infrared recording spectrophotometers. Under the conditions of illumination utilized in this specification the number of hours required to remove the acyloin completely is given in Table II. Apparently the time of illumination may be extended considerably beyond this minimum without harmful results.

If unchanged acyloin is present polymerization apparently continues to take place in the storage bottle eventually achieving a solid condition rather than the desired syrupy state and the utility of the material for the purpose to be described later is markedly impaired. This same loss in utility which is manifested in reduction or almost total elimination of photographic speed and indifferent photoresist results is also encountered when the syrup is made by thermal polymerization techniques even in the presence of the acyloins and it is for this reason that the upper limit of 30° C. is imposed on its preparation. When comparing the polymers produced in accordance with this specification as against similar syrups made thermally through ultraviolet and infrared absorption spectroscopy it is evident that radically different materials have been obtained in which only the low temperature modification is suitable for the purposes of the present invention.

The molecular weight or, more properly the molecular number, of the products thus achieved can be determined directly by simple viscosity measurements since tabular information is available in the literature with which such data can be compared for direct measurement of the molecular number. When one combines the ability to produce a dry film from such syrups on exposure to the air in the dark coupled with the photoresist effect to be described later, it is found that the molecular number of the best syrups regularly fall in a range of 1000 to 3000.

TABLE III.—VINYL MONOMERS COMPRISING THE SECOND CONSTITUENT OF THE PHOTOCOPOLYMERIZABLE COMPOSITION

A. Amides:
- (1) Acrylamide*
- (2) Methylacrylamide*
- (3) Methylacrylanilide
- (4) N,N'-diphenylmethylacrylamide
- (5) N-phenyl acrylamide B. Imides:
- (6) N-vinyl succinimide*
- (7) N-vinyl phthalimide*

C. Large substituent vinyls:
- (8) Vinyl stearate
- (9) 4-vinyl biphenyl*
- (10) N-vinyl carbazole*
- (11) Vinyl hydroquinone*

In order to make available the first useful version of our novel photopolymeric compositions a suitable vinyl monomer dissolved in a suitable solvent is added in solution form to the photopolymer in specific amounts. The three types of comonomers found suitable are listed in Table III. These are all either solids at room temperature or very high boiling point liquids and have little or no vapor pressure at room temperature. It is further noted that these stable high boiling point vinyl monomers are of three generic types and are so designated in Table III. They are either amides or imides or vinyl monomers of solid type which have a relatively large or a very large substituent attached to the vinyl group. Mixtures of vinyl monomers from one or more of these general types may be used in the same manner as single vinyl monomers.

The amounts in parts by weight of these added vinyl monomers versus the amount of photoactive "prepolymer" which provide a useful result extend as high as 50 parts by weight of vinyl monomer per 50 parts of active prepolymer down to 1 part by weight of vinyl monomer per 99 parts of active prepolymer. An optimum range for the vinyl monomer addition extends between 2 and 15 parts by weight of vinyl monomer for each 98 to 85 parts by weight of active photopolymer. Another way of expressing these numerical relationships where the combination is comprised solely of a mixture of active photopolymer and vinyl monomer to say that while the total range of useful addition of vinyl monomer is in the realm of 1 to 50 parts per 100 by weight the optimum range is between 2 and 15 parts by weight.

These vinyl monomers are supplied to the mixture as 10 to 20 percent solutions, preferably in hydrocarbon solvents such as cyclohexane, benzene or toluene. When the solubility of the monomer is low in such solvents as in the case for acrylamide, for example, a mixture of solvents comprising these hydrocarbons and methyl alcohol or acetone is utilized. Such mixtures are then applied into or on a suitable substrate.

Suitable substrates, depending on the eventual use, may be glass, metal, ceramic, polymer or resin coated or uncoated paper, or indeed substantially any substrate desired may be utilized for the purpose. In the case of nonporous substrates such as glass and many polymer films, the material coated thereon forms a film on its surface. For reactive substrates such as polyvinyl chloride or cellulose acetate, a considerable amount of absorption into the film surface can be achieved and for highly porous surfaces such as untreated paper the composition is imbibed almost totally into the pores of the paper.

When compositions of the type just described are spread on the chosen substrate, a surface will be produced which is dry to the touch usually within a time period of 1 to 2 hours. When faster drying times are required, and without interfering with the general overall effectiveness of the photoresist properties of the compositions of this invention, this drying time may be shortened to less than 30 minutes by adding to the composition a plastic film former in amounts not exceeding 25 percent by weight of the base composition, an amount of 10 percent by weight is preferred. The plastic film former found to be most effective and having the least effect on the photoresist properties of the overall composition is a high molecular weight polymeric material derived from the same monomer from which the active photopolymer is made except that in this case this high molecular weight material is produced by thermal techniques. Thus if the photopolymer is based on methylmethacrylate, for example, the addition for accelerating the film forming characteristics of the composition will be polymethylmethacrylate exhibiting a molecular weight in excess of 100,000 equivalent molecular numbers and in a case of vinyl acetate a high molecular number equivalent thermally polymerized polyvinyl acetate would be utilized. These are generally supplied to the composition as 10% solutions in a solvent such as ethyl acetate, acetone and the like.

Utilizing 10 percent by weight of such high molecular weight equivalent thermally produced polymers added to the base composition a surface or film which is dry to the touch in a period of 10 to 15 minutes is readily achieved without interfering with the dry photographic properties.

In order to define the photo response caracteristics of proper mixtures of the low molecular weight photopolymer fitted with a terminal labile substituent as defined in Tables I and II and the vinyl monomers in mixture therewith as defined in Table III, a wet film thickness in the range of 6 to 10 mils is spread on a glass plate under a yellow safelight and allowed to dry. Exposure is carried out under a General Electric Reflector type Sunlamp of 275 watts capacity at a distance of 8". Under such conditions of exposure reasonably uniform illumination is available in a square 4" on a side at the exposure plane involving 16 square inches in all. An exposure of 5 to 10 seconds is required. Immediately after the exposure, the specimen is placed on a black surface at a distance of 4" from a 175 watt reflector type infrared lamp fitted with a red ruby glass filter and retained under this type of illumination for 5 minutes and then allowed to cool. In place of heating with the infrared radiation the sample may be heated in an oven for a time period of at least 3 minutes and not exceeding 5 minutes at a temperature in the range of 120 to 135° C. and then allowed to cool.

In view of the significance of the amount and extent of this utraviolet exposure for later discussion purposes, the energy distribution of the G.E. RS Sunlamp in milliwatts/cm.$^2$ in the U.V. (the principal spectral region of absorption) is given in Table IV, relative to the image plane.

The sample is then immersed in benzene at room temperature for a period of 1 minute and then washed in benzene. This is sufficient to remove the non-ultraviolet light exposed materials entirely, the previously ultraviolet light exposed portions remaining completely insoluble in benzene and similar solvents such as toluene, xylene, cyclohexane and the like. All of the combinations listed in the first three tables posses this photoresist characteristic when formulated and processed as described. Certain of the combinations, however, develop a high degree of opalescence or opacity which exhibits a brownish black or black rendition on viewing by transmitted light thus enabling the image initially produced to be utilized for viewing purposes. An attempt to explain the development of opacity will be given in later portions of this specification. Roughly the same effects as obtained by exposure to ultraviolet light are also obtained on exposure to electron beams or X-ray. In the case of electron beams generaly, electron beams with accelerating voltages of at least 1 kilovolt are required, though acceleration voltages in the range of 10 to 15 kilovolts are preferred and the condition of developing the photoresist is still observed with electron beam yoltage in the megavolt region as available from the radioisotopes, for example. Again, all of the systems exhibit photoresist manifestations and the same systems which exhibit opacity also exhibit opacity when illuminated with electron beams so that direct viewing is possible. In order to achieve good photoresist or opacity rendition with these types of systems a minimum charge density of the order of 0.001 microcoulomb per square centimeter is required at which charge density writing speeds of the order of 100,000″ per second can be obtained.

TABLE IV.—ENERGY DISTRIBUTION OF LIGHT EXPOSURE AT IMAGE PLANE

| Wave length band (A.): | Energy (milliwatts/cm.$^2$) |
|---|---|
| 2800–2900 | 0.0593 |
| 2900–3000 | 0.154 |
| 3000–3100 | 0.403 |
| 3100–3200 | 1.05 |
| 3200–3300 | 0.828 |
| 3300–3400 | 0.178 |
| 3400–3500 | 0.0593 |
| 3500–3600 | 0.101 |
| 3600–3700 | 2.96 |
| 3700–3800 | 0.101 |
| 3800–4000 | 0.154 |

With X-ray illumination photoresist manifestations can be obtained even with soft X-rays in the 10 to 30 kilovolt range and even better results are obtained with hard X-rays in the 30 to 100 kilovolt range.

While I do not wish to be bound by any specific theory the ability to obtain a photoresist manifestation appears to be based on the ability of these systems to undergo copolymerization of a variety of types as initiated by ultraviolet light so that insolubility and copolymer formation takes place only in those areas initially exposed to ultraviolet light. On heating, in the absence of previous exposure to ultraviolet light, thermal polymerization takes place but probably not of a copolymerization type, so as a consequence the original solubility of the ingredients is more or less retained in the heated portions even though these have been fully polymerized. Incidentially, the fully polymerized areas in which such polymerization is accomplished fully by thermal means has lost its ability to become insoluble by further exposure to ultraviolet light and consequently the heating action not only establishes the difference between light exposed and non-light exposed areas but also is a fixing device for achieving permanency of image.

The combination of the active photopolymer and vinyl monomer appears to produce a copolymer on exposure to ultraviolet light as a consequence of the formation of photo excited states through the intervention of the labile terminal substituent present at the end of the molecule available in the photopolymer, such photo excited states probably leading to the formation of free radicals. This formation of free radicals leads to the possible formation of at least three types of copolymer. The first type is a straight linear conjugated type of polymer in which units of the added monomer alternate regularly with one molecule of the photopolymer to produce the very large polymeric molecule. Under these conditions it is not expected that opacity would develop and only differential solubility characteristics would be achieved. Depending on the exact location of the photoactive sites on both the monomer and the active prepolymer, graft copolymerization may take place. While it might be expected that the graft copolymer might be somewhat less soluble than the conjugated straight chain comonomer again the degree of solubility reduction is not expected to be sufficient to yield an opacity directly. Finally, a block copolymer may be produced. Since this is somewhat related to crosslinking but is not a pure case of crosslinking changes in solubility would be expected to be profound and in such cases one would expect opacity to develop along with the photoresist characteristics which are made evident by differential solubility treatments.

As pointed out previously, all of the various possible combinations between the agents producing the photopolymer as defined in Tables I and II and the monomers as defined in Table III yield photoresists when exposed under the conditions previously detailed. Certain of these monomers generally yield an opaque rendition also and these are marked with an asterisk in Table III.

While it has been indicated that I do not wish to be bound by any specific theory there is evidence that the photoresist characteristics described thus far are due to the differences in solubility achieved by thermal polymerization as compared to a combination of light-activated plus thermal polymerization and further that the formation of opacity is in all probability due to the formation of block copolymers rather than graft or conjugated copolymers. Thus the evidence appears to indicate that copolymerization of the desired type takes place only in those areas where a combination of actinic light and heat is used and where the actinic light is omitted straight thermal polymerization not accompanied by copolymerization develops.

A most important variation of the foregoing described photoresist system is based on the photo production of a copolymeric system through the use of polyfunctional materials normally utilized as crosslinking agents in the thermal preparation of copolymers. Crosslinking agents exhibiting a functionality of two or more have been found to be useful in a most unusual manner.

The crosslinking agents which have been found effective for the purpose of this specification are listed in Table V. Not all are equally effective for all systems and the degree of effectiveness is chiefly dependent on the nature of the original photopolymer used and the key to the best choice is given in the second column of Table V.

The useful range of dry weight crosslinking agent added to the combined dry weight of photoactive prepolymer and vinyl comonomer is in the range of 0.01 to 3.0 percent. Variations in this range of concentrations yield useful and unexpected variation in the end product.

As a general base for determining the effectiveness and the action of the crosslinking agents, 90 percent by weight of active "prepolymer" and 10% by weight of vinyl monomer were dissolved, usually in benzene and there was added thereto, also dissolved in a benzene solution to yield 10 percent by weight of the crosslinking agent, enough of such benzene solution to produce concentrations therein from 0.01 to 3.0%.

TABLE V.—USEFUL CROSSLINKING AGENTS

| Agent: | Best prepolymers (see Table I) |
|---|---|
| (1) Glyceryl trimethacrylate | 1, 2, 9 |
| (2) Diethyl maleate | 1 thru 9 |
| (3) Allyl anthranilate | 1 thru 9 |
| (4) Neopentylglycoldimethacrylate | 1, 2, 9 |
| (5) N,N'-hexamethylenebisacrylamide | 1, 2, 9 |
| (6) N,N'-methylenebisacrylamide | 1 thru 9 |
| (7) Ethylene dimethacrylate | 1 thru 9 |
| (8) N,N'-diallyl aniline | 1, 2, 9 |

After drying the plate as before to produce a dry film, the general ultraviolet light treatment and subsequent infrared treatment were as previously described except that the ultraviolet light was varied to determine the shortest exposure of light needed to produce a noticeable effect.

Two unusual and very highly useful results were obtained. First, the time of exposure needed to produce a good photoresist effect was reduced at least by a factor of 10 and in many cases by a factor of 50 so that a strong enough difference in solubility to be clearly distinguished by immersing in cold benzene could be obtained by an ultraviolet exposure not exceeding 1 second. A second unusual effect was the fact that in many cases, the area which was most insoluble in the benzene leaching solution was the portion which had not been previously subjected to ultraviolet light but only to the infrared treatment. Such a result could be termed "positive working" and is just the reverse of the effect noticed in the absence of the crosslinking agent. With concentrations of the crosslinking agent. With concentrations of the crosslinking agent in the middle and higher portions of the range of concentrations between 0.01 percent and 3.0 percent the positive working characteristic was generally obtained. However, if the amount of crosslinking agent was decreased to below 0.3 percent and preferably to a range of 0.01 to 0.1 percent the original negative working characteristic was again achieved without loss in photographic speed, that is, while still retaining the pronounced increase in speed over that normally available in the absence of the crosslinking agent.

For many of the systems the strong positive working effect is obtained in the medium to high range of addition of crosslinking agents, that is, in a range of 0.5 to 3.0 percent and that when this is achieved a negative working effect is obtained as explained above, in lower ranges of additions of crosslinking agents.

Certain crosslinking agents defined in the tables, however, appear to be so powerful in their effectiveness in thermal polymerization that not only is the positive working effect only obtained but the amount of crosslinking agent required to produce the effect must be in the range of 0.01 to 0.1 percent. With these exceptionally powerful crosslinking agents, designated in the table, even a very minute amount of such agent does not enable one to produce a positive or negative effect at will and only a positive effect is achieved. As a matter of fact, if the amount of crosslinking agent is increased much above 0.1 percent the crosslinking action is so potent that both the light exposed and the unexposed areas become completely insoluble.

It appears now appropriate to include in this description of my novel compositions of matter, the precise distinctions of such compositions and their method of handling over those described in the prior art. In earlier portions of this description the results of a combination of light and heat exposure to a combination of photoactive "prepolymers" and various crosslinking agents yielded no differential solubility characteristics even though the overall solubility of the system had been decreased. In attempting to define the basic essence of the difference between my invention and those described in the prior art, at least one portion of this important difference appears to reside in the composition of the photoactive "prepolymer" matter prepared by the rigidly controlled process imposed on the combination of agents as defined in Tables I and II.

Prior art known to me and relating to the subject matter of my invention includes U.S. Patent 2,413,973, dated Jan. 7, 1947, in which among other preferred compositions, preferred ingredients involve a combination of a monomer such as methylmethacrylate, a polyfunctional crosslinking agent such as hexamethyleneglycoldimethacrylate, and a photopolymerization catalyst generally designated as the class of alpha ketal-donyl alcohols of which the acyloins are a subclass. In place of monomeric methylmethacrylate partially polymerized syrups or gels based on such a monomer may be advantageously used. These materials are also generally utilized in the presence of a cocatalyst such as an organic peroxide. When the foregoing combination is based on the monomer an exposure time of several hours under a mercury arc light at 30° C. is required to complete the photopolymerization as defined in Example 1, column 5 of the referred to patent. Even when syrups of the partially prepolymerized form are utilized exposure time to the mercury arc lamp at 10 to 120 minutes are required (line 41, column 4). In Examples 2 and 3, the syrups are prepared at 80° C. in the presence of the combined peroxide-acyloin initiator and in Example 4 similar mixtures are utilized to prepare syrups at 60° C. in the presence of ultraviolet light. It should be noted that even for the composition produced in Example 4 where ultraviolet light was used as an aid for the preparation of the syrup, a subsequent exposure of 1 hour was required to complete the polymerization in contrast to the 1 second or less as defined in the present invention. The profound effect of thermal polymerization is adequately defined in Example 5 of the patent in which a mixture of monomer, crosslinking agent and polymerization initiators is heated for a few minutes at 100° C. to develop a gel form, thus defining that by virtue of the manner in which the composition is handled and the mixture of its ingredients that the effect of heat and light as far as properties of end products are concerned is the same and that no differential properties should be anticipated in confirmation of my own evaluation of the treatment of mixtures of photoactive "prepolymers" and crosslinking agents. The lack of distinction between light and thermal treatments is clearly defined in the referred to issued patent in lines 25 to 35 of column 11, where the use of temperatures up to 100° C. are indicated as suitable whereas I have pointed out the basic differences leading to my novel results obtained by a more precise manipulation of heat and light and the requirement that no thermally polymerized material of any extent should be present in the photoactive "prepolymer." A more profound distinct is the absence of free acyloin in my composition as a consequence of the method of preparation of the "prepolymer." Thermal polymerization under the utilization of the referred to prior art invariably leaves significant quantities of unchanged activator in the composition even though the usual practice described in the patent is the deliberate addition of fresh amounts of activator for speeding up the ultraviolet light polymerization. A final important distinction is that the compositions of U.S. Patent 2,413,973, prior to exposure do not form dry films. The compositions of this patent are not suggested for photographic purposes.

The other related prior art includes British Patents 567,776 and 567,778, Mar. 2, 1945. These deal with substantially the same compositions as defined in U.S. Patent 2,413,973, utilizing both monomers and syrups in the presence of acyloins and peroxides as photo initiators.

The first application of such cements is at 60° C. as defined in the majority of examples and the polymerization is completed by an intensive exposure to ultraviolet light extending for a time period of at least 10 minutes. Crosslinking agents are not utilized in 567,776 and again the amount of light exposure required are several orders of magnitude greater than that defined in our invention. Again, the equivalent action of ultraviolet light and heat is accepted in 567,776 and no inference of the probability of obtaining controlled differential solubility is indicated in the specification. The closest approach towards achieving a proper photoactive "prepolymer" is described in Example 2 but this utilizes a combination of peroxides and acyloins and again the subsequent ultraviolet exposure of at least 10 minutes is required for completion of the polymerization.

British Patent 567,778 extends the types of acyloins which may be utilized for initiation and also deals with formation of a "prepolymer" but with the use of ultraviolet light, namely 40° C., which our experience indicates will yield significant quantities of undesired thermally polymerized matter. Again 567,778 defines the requirement for excessive ultraviolet radiation generally coupled with the addition of heat in order to complete the polymerization nor is the potential for obtaining dry films described. Light sources of excessive intensity compared to those utilized in the present invention are utilized throughout. Elevated temperatures are recommended, as high as 100° C., and it is quite evident from reading the specification that the composition is as readily polymerizable by heating as by ultraviolet light and combination of heat and light and did not provide the distinct differential solubility available from the instant invention. The use of crosslinking agents or other additives for accelerating the polymerization process is not defined in either 567,778 or 567,776.

U.S. Patent 2,722,512 covers the utility of substituted acyloins for similar devices and exhibits the great advantage for purposes of comparison of the prior art with the results obtained by the practice of the present invention in that the light sources are clearly defined in the patent so that time comparisons can be presented with some degree of precision. Alpha substituted acyloins are utilized and the process as defined in 2,722,512 is alleged to yield identical results whether bulk, emulsion, granular, or solution polymerization techniques are utilized, whereas in the present invention only bulk polymerization techniques are effective for the purposes of our invention. Examples 1 through 8 of the referred to U.S. patent describe the results of exposure of various monomers mixed with substituted acyloins to produce the completely polymerized state. No cooling of the reaction vessel is imposed and the closeness of the 30 watt exposure source indicates that substantial heating of the vessel must have taken place. Example 9 of the patent describes a mixture of alkyd resins, monomeric liquid styrene and a substituted acyloin. Outside of the fact that this liquid would not dry if spread on a thin film on an exposed surface, exposure to a light source initiating polymerization of a total of 17.7 watts indicated that a period of 32 minutes is required to yield the degree of insolubility achieved with the compositions of the present invention thus far described in periods of exposure of less than 1 second and at considerably lower light levels. Columns 4 and 5 of the referred to U.S. patent describe the use of mixtures of various monomers including some of those disclosed in the present description with or without the addition of crosslinking agents. In each case, the significance of the utilization of the specially prepared photoactive "prepolymer" defined in the present invention has been omitted not only in this patent but also in the other patents noted above. The ability to produce dry films from any of these prior art compositions is non-existent and the requirement for the prevention of thermal polymerization, or to be more specific, including devices for insuring that preparation of the syrup be carried out at temperatures of 30° C. or less is further not defined. In none of the information provided by the prior art is the generic composition involving a combination based on the photoactive "prepolymer" capable of producing a dry film described.

The most important phenomenological distinction between prior art of the type indicated and the present invention is the unusual performance imposed by the presence of controlled quantity of polyfunctional additives which makes it possible to obtain positive or negative rendition at will as a function of control of concentration of said crosslinking agents.

The compositions already described may be further improved by the addition thereto of additives of such nature that the overall composition contains, in compatible fashion, a combination of strong electron donor and electron acceptor groups. When such compounds are mixed in simple solution an ultraviolet absorption spectra is obtained different than that of the ingredients separately which invariably moves the absorption edge towards longer wavelengths, sometimes by as much as 500 A. This is particularly the case in the simple mixture of prepolymers as defined in Table I which contain carbonyl groups along with vinyl amides and imides in which the charge transfer complex apparently is produced between the electron acceptor carbonyl groups of the prepolymer and the amide or imide groups of the comonomer having strong electron donor character. Certain compounds are found to be unusually effective and these are listed in Table VI. All of these compounds are nitro-aryl derivatives and it should be noted that when a combination of electron donor and electron acceptor characteristics available from substituents which exist in vicinal positions, the compound is most effective. Column 3 of Table VI, gives the time in seconds of exposure for the production of a definite photoresist effect with the process described previously.

TABLE VI.—ACCELERATORS OF PHOTORESIST FORMATION

[100 g. PVA prepolymer (3/100) plus 10 g. vinylsuccinimide plus 0.5 g. N-N methylene bisacrylamide]

| No. | Compound | Conc. | Time, sec. | Effect |
|---|---|---|---|---|
| 1 | 2,4 dinitroaniline | 10% | 0.002 | Positive |
| 2 | do | 1% | 0.002 | Do. |
| 3 | m-Nitrophenol | 10% | 0.005 | Do. |
| 4 | do | 1% | 0.005 | Negative |
| 5 | p-Nitrodiphenyl | 10% | 0.002 | Do. |
| 6 | do | 1% | 0.02 | Do. |
| 7 | m-Nitroaniline | 1% | 0.02 | Positive |
| 8 | 2 chloro 4 nitroaniline | 1% | 0.02 | Do. |
| 9 | 2,6 dichloro 4 nitroaniline | 10% | 0.002 | Negative |
| 10 | 2,6 dichloro 4 nitroaniline | 1% | 0.002 | Do. |

Three of the compounds in the table are outstanding in their performance and a brief performance and a brief description of their electron donor acceptor characteristics defines the basis for this portion of our invention. For example, 2,4-dinitroaniline contains a strong electron acceptor, namely the nitro group, in a vicinal position to a strong electron donor, namely the amino group. Paranitrodiphenyl, established experimentally as being about as effective as the 2,4-dinitroaniline exhibits similar characteristics. The strong electron acceptor substituent, namely the nitro group, is again present and the hydrogens in vicinal positions are expected to be strong electron donors as a consequence of the steric strain imparted by the diphenyl substituent. Metanitrophenol is almost as effective as the first two agents but significantly somewhat less though again contains strong electron donor and acceptor substituents, these being the hydroxyl and nitro substituents respectively but by virtue of their meta positional relationship the anticipated reduction in speed was obtained. The ortho nitro phenol compound exhibits the anticipated improvement by virtue of the vicinal positional relationship between the nitro and hydroxyl substituents.

In dealing with the various ingredients of the base composition, the same sort of relationships are found to exist. Again, nitro and carbonyl substituents have electron acceptor character of high order whereas substituents taken from the class of amine, imine, trivalent nitrogen, and hydroxyl groups will be strong electron donors.

It has been found that the most effective compositions for the purposes of this invention are comprised of a mixture of prepolymers containing carbonyl substituents, comonomers, containing amide or imide substituents, crosslinking agents having acrylamide groups (containing an electron donor substituent such as the amine radical in a vicinal position to an electron acceptor substituent such as carbonyl), combined with minor percentages of the strong electron donor acceptor compounds listed in Table VI. It further appears that the higher the concentration of electron donor and acceptor substituents (not compounds) in the overall composition of compatible nature, the greater the photographic speed.

In order to define on a more precise basis the most useful compositions for the purposes of this portion of this invention all of the prepolymers based on the monomers given in Table I are effective and it appears that their donor acceptor characteristics are enhanced by the retention of the carbonyl and hydroxyl substituents of the compounds listed in Table II in the prepolymerization step. The amides and imides of Table III are the most effective comonomer portions of the composition by virtue of the presence of the relatively strong electron donor amine and imine terminal substituents present in their structure. N-vinylcarbazole containing the electron donor characteristics of the N-vinyl group is about as effective as the amides and imides from Table III. The remaining large substituent vinyls are relatively ineffective. The crosslinking agents listed in Table V based on acrylamides are substantially more effective for the purpose of these compositions than the other crosslinking agents, in all probability due to the strong electron donor acceptor characteristic of the vicinal carbonyl amine substituents present in such compounds.

In careful examination of the vinyl monomers listed in Table III, it was found that vinyl succinimide was more effective in the composition in the development of superior photographic speed than the other compounds listed. Significantly, its structure given in Table VIII in comparison with that of acrylamide defines that it contains two carbonyl substituents in a vicinal position to the trivalent nitrogen substituent and it would be thus expected that this increase in electron acceptor characteristics is responsible for its improved performance.

TABLE VII.—STRUCTURE OF DONOR-ACCEPTOR
[Type of Compounds: —C=O, acceptor; —$NH_2$, donor]

| | Compound | Structure |
|---|---|---|
| 1 | Acrylamide | $NH_2$—C(=O)—CH=$CH_2$ |
| 2 | Vinyl succinimide | $(CH_2)_2$(C=O)$_2$N—CH=$CH_2$ |
| 3 | Allyl anthranilate | $NH_2C_6H_4$—C(=O)—O—$CH_2$—CH=$CH_2$ |

Thus, in summary, although all of the compositions for the improvement in photographic speed indicated in Table VI are useful in the present invention, a preferred composition is as follows:

A photoactive "prepolymer" prepared by the type of reaction hitherto described between 3 moles of benzoin and 100 moles of purified vinyl acetate;

A lesser quantity of vinyl succinimide;

A minor quantity of the crosslinking agent N,N'-methylenebisacrylamide; and

A minor quantity of a nitroaryl compound selected from the group including 2,4-dinitroaniline, paranitrodiphenyl, metanitrophenol and metanitroaniline, in other words, nitro aryl derivatives having strong electron donor and acceptor substituents, preferably in vicinal positions but certainly not greater than meta in which the preferred strong electron acceptor substituent is the nitro radical and the preferred strong electron donor radical is amine or hydroxyl radical. Occasionally the crosslinking agent can be omitted without loss of speed for certain agents.

In order to more fully illustrate the ranges of preferred components for the high speed photographic system of this invention, the following is presented. One hundred parts by weight of a syrup prepared in the form of the fully active "prepolymer" based on vinyl acetate and benzoin are mixed with 10 parts of vinyl succinimide. One part of dinitroaniline and up to 0.5 part of N,N methylenebisacrylamide are added to the mixture. With the exception of the photoactive "prepolymer" all of the remaining materials are in the form of 10% benzene solutions.

This composition is prepared under a dim yellow safe light and spread on a glass surface and allowed to dry in the dark for 1 hour. Thereafter, it is exposed to the light source as defined in Table IV, using a Compur shutter for the purpose, in which exposures from 0.1 to 0.002 second may be accurately obtained. Immediately after the exposure to the ultraviolet, the specimen is placed under a 175 watt reflector type infrared lamp fitted with a ruby glass filter and retained at a distance of 4" from such light source on a black metalized background for a period of 5 minutes. After cooling to room temperature, the evidence of photoresist formation is defined by an immersion in benzene at room temperature for a period of 1 minute. A complete photoresist action was obtained in each instance for all of the materials indicated in the table at 0.01 second and as further defined in the table the compounds 2,4-dinitroaniline and paranitrodiphenyl produced complete exposures at the highest shutter speed, namely 0.002 second.

Utilizing the amides, imides and N-vinyl compound of Table III in place of the vinyl succinimide on a weight for weight substitution produced complete photoresist action with the various other additives at exposure times of 0.05 second, this being at least a factor or 20 greater than that obtained in the presence of crosslinking agent and in the absence of the nitroaryl type of sensitizer.

The amount of vinyl comonomer, utilizing the preferred 3/100 benzoin/polyvinylacetate photoactive "prepolymer," was also investigated and it was found that the best results were obtained in a preferred range of 2 to 15 parts by weight of comonomer per 100 parts by weight of photoactive "prepolymer" and that the optimum concentration was about 10 parts by weight.

The amount of crosslinking agent relative to the optimum concentration was also traversed to the detailed examination of N,N'-methylenebisacrylamide, the area of lowest solubilities was always the exposed portion in amounts of crosslinking agent covering a range of approximately 1 part to 3 parts per 100 parts of photoactive "prepolymer." In the range of 0.01 to 1.0 part of crosslinking agent per 100 parts of photoactive "prepolymer" the same effect was obtained except that exposure less than 5 milliseconds and under these conditions a reverse effect was obtained in which the positive variation was exhibited, namely the unexposed portions showed lower solubility than the exposed portions. In the case of certain sensitizers, such as p-nitrodiphenyl, the crosslinking agent could be omitted, thus leading to a range of 0.00 to 3.0. Designating the nitroaryl compounds as "sensitizers" the optimum range of these materials was also investigated between 0.01 part per 100 parts of "prepolymer" and 10 parts per 100 parts of "prepolymer." While noticeable beneficial effects were obtained all over the range, the optimum values were achieved in the general region of 1 to 10 parts of "sensitizer" based on the prepolymer and the 1 part addition being preferred.

In certain cases the use of the crosslinking agent was deleterious as for example in the case of the use of paranitrodiphenyl. In this case 100 parts of "prepolymer" mixed with 10 parts of vinyl succinimide, and 1 part of paranitrodiphenyl produced a result superior to a comparable composition consisting of 100 parts of prepolymer, 10 parts of vinyl succinimide, 10 parts of paranitrodiphenyl, and 0.5 part of N,N'-methylenebis-acrylamide. These variations appear to be due to the balance of the combined electron acceptor donator substituents rather than to any change in kind in the ingredients utilized.

Having now defined my invention in general terms, the following examples are illustrative of the invention and are not intended to be limiting in any way.

*Example 1*

The monomers, listed in Table VIII (made part of this example), are purified by low temperature vacuum distillation under a nitrogen atmosphere. The pressure of distillation in each case is controlled so that the temperature of distillation does not exceed 45° C. The chilled receiver in which the purified monomer is collected is painted black to reduce exposure to light as much as possible.

Immediately after the purification step is completed, a mixture of benzoin and the respective purified monomer in the amounts defined in Table VIII are placed in a triple-necked 2 liter Pyrex flask, fitted with stirrer, thermometer and a capillary inlet to permit an atmosphere of nitrogen to be maintained throughout the subsequent operation. While being stirred under nitrogen the mixture of powdered benzoin and liquid monomer is exposed to a G.E. RS 275 watt sunlamp at a distance of 18" for a period of 20 hours. Calibration of this light source under these conditions indicates that the material in the flask is being subjected to approximately 1.2 milliwatts per sq. cm. of ultraviolet energy in the range of 3000 to 4000 Angstrom units. The exposure to the ultraviolet light is continued for 20 hours and the temperature of the reaction mixture is retained below 30° C. throughout this period by blowing cold room air past the reaction vessel, with a fan.

The syrupy somewhat viscous liquids obtained as a result of the 20 hour exposure to the ultraviolet light of the foregoing description are placed in tightly stoppered brown bottles as base materials for the compositions described in later examples. As indicated in the table, the abbreviated designations of the photoactive "prepolymer" thus prepared will be utilized in these subsequent examples.

TABLE VIII.—EXAMPLE 1: STARTING COMPOSITIONS FOR PRODUCTION OF PHOTOACTIVE "PREPOLYMERS"

| Monomer | Wt. of Monomer Used, g. | Wt. of Benzoin to produce 1/100 mole ratio, g. | Wt. of Benzoin to produce 3/100 mole ratio, g. |
|---|---|---|---|
| Vinyl acetate | 860 | 21.2 | 63.6 |
| Methyl methacrylate | 1,000 | 21.2 | 63.6 |
| Methyl vinyl ketone | 710 | 21.2 | 63.6 |

(Abbreviated designation of photoactive "prepolymers"):

Vinyl acetate=PVA *
Methyl methacrylate=PMMA *
Methyl vinyl ketone=PMVK *

*Example 2*

The various solid vinyl monomers in pure form listed in Tables IX, X and XI (made part of this example), were mixed with the photoactive "prepolymer" of Example 1 to yield the proportions listed in the table. This mixing was carried out under a yellow safe light. The various solid vinyl monomers were supplied as 10% solutions in benzene with the exception of acrylamide which was made available as a 10% solution in anhydrous methyl alcohol. The compositions as given in the various tables were spread on glass slides using a 10 mil doctor knife, then placed in the dark and allowed to dry over night. A dry film thickness of the order of 6 to 7 mils was obtained in each case. A sufficient number of examples of each of the various compositions given in the tables attached to this example were made to permit study of the variation of time of exposure. The samples were then exposed under a G.E. Reflector Type Sunlamp of 275 watts capacity at a distance of 8". The glass samples were placed on a white background and half of the samples were masked off with a sheet of black paper. Immediately after exposure, the specimen was placed on a black surface at a distance of 4" from a 175 watt reflector type infrared lamp fitted with a red ruby glass filter and retained under this lamp for 5 minutes and then allowed to cool. The samples were then immersed in benzene at room temperature for a period of 1 minute, drained and allowed to dry.

The time in seconds given in the table was the time of exposure required to make a complete differentiation between exposed and unexposed areas, although it was evident in a number of cases that for times of exposure less than that given in the table a differentiation was evident but not to the point where the exposed portion was completely insoluble and the unexposed portion completely soluble.

Some of the monomers and photoactive polymer mixtures produced opacity along with the photoresist characteristics and particularly in the case of acylamide, vinyl succinimide, vinyl hydroquinone, and vinyl carbazole. This opacity appears brown or brownish black in transmitted light.

TABLE IX.—EXAMPLE 2: PHOTORESIST EFFECTS OBTAINED FROM MIXTURES OF POLYVINYLACETATE PREPOLYMER AND SOLID VINYL COMONOMER

| Comonomer (10% by wt. of dry composition) | Time In Seconds PVA,* 1/100 mole ratio (90% by wt. of dry composition) | | Time In Seconds PVA,* 3/100 mole ratio (90% by wt. to dry composition) | |
|---|---|---|---|---|
| Acrylamide | Resist | 10 sec. | Resist | 5 sec. |
| | Opacity | 10 sec. | Opacity | 5 sec. |
| Methylacrylamide | Resist | 20 sec. | Resist | 10 sec. |
| | Opacity | 30 sec. | Opacity | 20 sec. |
| Methylacrylanilide | Resist | 30 sec. | Resist | 10 sec. |
| | Opacity | 20 sec. | Opacity | 15 sec. |
| N,N'-diphenylmethyl-acrylamide. | Resist | 30 sec. | Resist | 15 sec. |
| Vinyl succinimide | Resist | 20 sec. | Resist | 10 sec. |
| | Opacity | 40 sec. | Opacity | 20 sec. |
| N-vinyl phthalimide | Resist only. | 120 sec. | Resist | 60 sec. |
| | | | Opacity | 60 sec. |
| Vinyl stearate | Resist only. | 180 sec. | Resist only. | 60 sec. |
| 4-vinyl biphenyl | Resist only. | 30 sec. | Resist | 10 sec. |
| | | | Opacity | 30 sec. |
| N-vinyl carbazole | Resist | 20 sec. | Resist | 5 sec. |
| | Opacity | 60 sec. | Opacity | 20 sec. |
| Vinyl hydroquinone | Resist | 40 sec. | Resist | 10 sec. |
| | Opacity | 80 sec. | Opacity | 30 sec. |
| N-phenyl acrylamide | Resist | 80 sec. | Resist | 10 sec. |

TABLE X.—EXAMPLE 2: PHOTORESIST EFFECTS OBTAINED FROM MIXTURES OF PHOTOACTIVE POLYMETHYLMETHACRYLATE PREPOLYMER AND SOLID VINYL COMONOMERS

| 10% by wt. Comonomer | 90% by wt. 1/100 PMMA* | 90% by wt. 3/100 PMMA* |
|---|---|---|
| Vinyl stearate | 120 sec. | 60 sec. |
| Vinyl succinimide | 120 sec. | 60 sec. |
| N-vinyl phthalimide | 30 sec. | 60 sec. |
| Acrylamide | 30 sec. | 30 sec. |
| Methylacrylamide | 30 sec. | 60 sec. |

TABLE XI.—EXAMPLE 2: PHOTORESIST EFFECTS OBTAINED FROM MIXTURFS OF PHOTOACTIVE POLYVINYLMETHYLKETONE PREPOLYMER AND SOLID COMONOMERS

| Monomer at 10% | PMVK* (3/100) at 90% |
|---|---|
| Acrylamide | 20 sec. |
| N-vinylsuccinimide | 30 sec. |
| Methylacrylamide | 40 sec. |
| N-vinyl carbazole | 30 sec. |
| Vinyl hydroquinone | 60 sec. |

(Opacity and resist develop in each of the above in about the same length of time.)

*Example 3*

Utilizing the compositions given in Table XII (made part of this example), films and exposure conditions as defined in Example 2, were imposed on such compositions. The cross-linking agents were added to the composition as 1% solutions in benzene and the time of exposure given in column 3 of Table XII, is the time for yielding a total effect even though lesser times sufficient to define the difference in solubility actually existed. For the majority of the cases listed in the table defined as "1 second" it appeared that the actual time required to give the definitized effect indicated was less than 1 second and this figure apparently represents the maximum. In the 4th column of the table labeled "effect" the terms "positive" and "negative" are defined as follows: when the portion previously exposed to ultraviolet light is the portion which remains insoluble in the post treatment of benzene, the system is designated as "negative working"; and when the portion which has not been treated with ultraviolet light but has been treated only with heating or infrared is the more insoluble in benzene, the system is designated as "positive working."

TABLE XII.—EXAMPLE 3

[3/100 PVA* (See Example 1) 90%, plus acrylamide, 10% plus crosslinking agent]

| Crosslinking Agent | Conc. | Time | Effect |
|---|---|---|---|
| Glyceryltrimethacrylate | 0.5% | 5 sec | Positive. |
| Do | 1.0% | 1 sec | Do. |
| Neopentyldimethacrylate | 1.0% | 1 sec | Do. |
| Do | 0.1% | 3 sec | Negative. |
| Allyl anthranilate | 0.1% | 5 sec | Positive. |
| Do | 2.0% | 3 sec | Do. |
| Do | 0.01% | 1 sec | Negative. |
| N,N'-hexamethylenebisacrylamide | 0.1% | 3 sec | Do. |
| Do | 0.5% | 3 sec | Positive. |
| N,N'-methylenebisacrylamide | 0.1% | 1 sec | Negative. |
| Do | 0.5% | 5 sec | Positive. |
| Diethyl maleate | 0.1% | 1 sec | Negative. |
| Do | 1.0% | 3 sec | Positive. |

*Example 4*

In Table XIII (made part of this example), the ingredients as defined therein were mixed, spread out on glass plates and exposed as defined in Example 2, and the photoresist effect as a function of concentration of the crosslinking agent is determined.

TABLE XIII.—EXAMPLE 4

[3/100 PVA* (See Example 1) 90% plus vinyl succinimide 10% plus crosslinking agent]

| Crosslinking Agent | Conc. | Time | Effect |
|---|---|---|---|
| Glyceryltrimethacrylate | 0.1% | 1 sec | Negative. |
| Do | 0.5% | 1 sec | Positive. |
| Allyl anthranilate | 0.1% | 3 sec | Negative. |
| Do | 0.5% | 1 sec | Positive. |
| N,N'-methylenebisacrylamide | 0.5% | 1 sec | Do. |
| Diethyl maleate | 0.1% | 3 sec | Negative. |
| Do | 0.3% | 1 sec | Positive. |
| Ethylene dimethacrylate | 0.5% | 1 sec | Do. |
| Do | 1.0% | 1 sec | Do. |
| N,N-diallyl aniline | 0.1% | 3 sec | Negative. |
| Do | 0.5% | 1 sec | Positive. |

*Example 5*

The ingredients as defined in Table XIV (made part of this example), were mixed under a yellow safe light as before, spread and exposed in accordance with the conditions given in Example 2.

TABLE XIV.—EXAMPLE 5

[3/100 PMMA* (See Example 1) 90% and 10% acrylamide with crosslinking agents]

| Crosslinking Agent | Conc. | Time | Effect |
|---|---|---|---|
| Allyl anthranilate | 1.0% | 1 sec | Positive. |
| Diethyl maleate | 0.5% | 3 sec | Do. |
| Ethylene dimethacrylate | 1.0% | 1 sec | Do. |

*Example 6*

Under a yellow safe light, 45 grams of the photoactivated polymethylmethacrylate syrup (prepared as defined in Example 1 in the ratio of 3 moles of benzoin to 100 moles of methylmethacrylate) were mixed with 45 grams of the 3 benzoin to 100 ratio polyvinylmethylketone. Thereto were added a solution of N-vinyl carbazole in benzene containing 10 grams in 50 ccs. of benzene and then 10 ccs. of a benzene solution of glyceryltrimethacrylate containing 1 gram of the latter component. At a 10 mil wet thickness as defined in Example 1, films were spread and allowed to dry overnight and then exposed as further defined in Example 2. Exposure times of 1 second yielded a clean, positive working effect after treatment in benzene and the material remaining on the slide was faintly opalescent and almost transparent.

*Example 7*

The same ingredients as utilized in Example 6 were prepared, except that the amount of glyceryltrimethacrylate was reduced to 0.01 gram by adding 1 cc. of a 1% benzene solution of this reagent. Again, films were prepared and exposed as before as defined in Example 2 for a period of 1 second. In this case, a very clean, negative working effect was obtained on treatment with benzene with the exception that the material remaining on the slide exhibiting the negative working effect was highly opaque, rather than translucent. On viewing by transmitted light, this opacity was noticeable before the final benzene solution with the result that the distinction between light and non-light exposed areas was made evident easily simply by viewing by transmitted light without the benzene solution treatment.

*Example 8*

The photosensitive mixture as described in Example 7 was exposed to 30 kilovolt, 10 milliampere X-rays from a Coolidge type tube containing a copper anode. The exposure distance was 10" and the time of exposure was 3 seconds. Again, the opaque brown-black transmitting image in the X-ray exposed portions of the specimen was obtained. The masked portions were transparent and soluble in benzene, whereas the exposed portions were insoluble.

*Example 9*

Using the composition as described in Example 7, a negative working image was obtained with a brownish color on exposure of the photosensitive material to 15 kilovolt electron beams having a beam current of 25 microamperes and utilizing a writing speed of 50,000 inches per second. The traces could be readily seen on viewing by transmitted light.

*Example 10*

The compositions of Table VI of this specification (made part of this example) were prepared to yield the dry weights given in the table. Column 2 designated as "concentration" relates to the percentage of the nitro aryl compounds listed in Table VI, based on the amounts of the photoactive polyvinylacetate prepolymer of the 3 moles of benzoin per 100 moles of vinyl acetate category. The vinyl succinimide, the N,N-methylenebisacrylamide and the nitroaniline compounds listed in the table were supplied as 10% benzene solutions in an amount sufficient to yield the dry weights given in the table. Exposure to the light source given in Example 2 was made through a Compur shutter in order to obtain exposure times listed in Table VI. Composition 2 of Table VI was examined in detail as a function of time of exposure for periods greater than those listed in Table VI. It was found that for exposure times of 5 milliseconds or greater the ultraviolet light exposed portions were the areas of eventual insolubility and thus for these longer exposure times, the composition is categorized as negative. For exposure times of less than 5 milliseconds and particularly 2 to 3 milliseconds, the area of greatest insolubility was the unexposed portions and therefore the composition may be listed as positive working as defined in the table.

*Example 11*

100 grams of the 3/100 benzoin-polyvinylacetate syrup prepared as defined in Example 1, 10 grams by weight of vinyl succinimide, 1 gram by weight of paranitrodiphenyl, and 25 ccs. of benzene were laid out and mixed under a yellow safe light and spread on a glass plate by the techniques defined in Example 2 and allowed to dry overnight after which it was exposed to the ultraviolet lamp indicated in Example 2, utilizing the Compur shutter for exact determination of exposure times. After the infrared treatment and solution in benzene, a negative working resist was obtained down to exposure time of 0.002 second. It should be noted that this result was obtained without the use of a deliberately added crosslinking agent.

In the preceding description, unless otherwise specifically indicated, all percentages are by weight.

Having now described this invention it is not intended that it be limited by the description except as defined in the appended claims.

I claim:

1. A process of producing a prepolymer having a molecular number of between about 1000 and 3000 which comprises:

preparing a mixture consisting of purified vinyl monomer and an acyloin compound represented by the formula

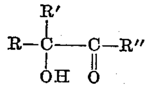

wherein R and R″ are each selected from the group consisting of alkyl and aryl and R′ is selected from the group consisting of H, alkyl and aryl, there being between 0.1 and 10 moles of said acyloin compound in said mixture for every 100 moles of said purified vinyl monomer;

exposing said mixture to radiation in the ultraviolet while maintaining the temperature of said mixture below 30° C. and the atmosphere above said mixture free from oxygen; and continuing said exposure to U.V. radiation at said temperature for between about 20 and 100 hours, until substantially all of the acyloin in said composition has been expended in the polymerization reaction and recovering the prepolymers as a syrup having the stated molecular number.

2. The process of claim 1 wherein R″ is aryl.

3. The process of claim 2 wherein the acyloin is benzoin.

4. The process of claim 1 wherein the mole ratio is between 1 and 3 moles per 100 moles.

5. The process of claim 1 wherein said vinyl polymer is purified by vacuum distillation at a low temperature into a chilled receiver, prior to preparing said mixture.

6. The process which comprises:

preparing the prepolymer of claim 1;

mixing the same with a vinyl monomer selected from the group consisting of monomers which are solids at room temperature and liquids having high boiling points, and having a very low vapor pressure at room temperature, the amount of said prepolymer in said mixture being between 1 part by weight and 99 parts by weight for each part by weight of said vinyl monomer;

spreading the resulting mixture on a support, to form a thin layer thereof; and drying the resulting product.

7. The process of claim 6 wherein the relative proportions of vinyl monomer are between 2 and 15 parts by weight in each 100 parts by weight of the mixture.

8. The process of claim 6 wherein the support is a sorbent material and the mixture is adsorbed therein.

9. The process of claim 6 wherein the support is a non-sorbent material and the mixture forms a dry film thereon.

10. The process of claim 6 including in addition, incorporating between about 0.01% and 3% by weight of a crosslinking agent into said mixture before the mixture is spread on a support.

11. The process of claim 10 wherein the amount of crosslinking agent is controlled to selectively produce after exposure of said composition to a pattern of radiation in the ultraviolet and then to a dose of radiation in the infrared, a positive working effect or a negative working effect.

12. A photographic process which comprises:

preparing the dried product resulting from the process of claim 6;

exposing said dried product to a pattern of radiation in the ultraviolet for a short interval of time; and thereafter subjecting the said exposed product to infrared radiation for a longer interval of time.

13. A photographic process which comprises:

preparing the product of the process of claim 10;

exposing said product to a pattern of radiation in the ultraviolet for a short interval of time; and thereafter subjecting the said product of infrared radiation for a longer interval of time.

14. A photographic process according to claim 10 wherein the exposure is to X-rays.

15. A process according to claim 6 including in addition, incorporating up to about 10 parts by weight of a nitro aryl compound in said composition for each 100 parts by weight of prepolymer therein.

16. The process of claim 11 wherein the amount of crosslinking agent is sufficient to produce a positive resist as a result of said exposure to ultraviolet radiation.

17. The process of claim 11 wherein the amount of crosslinking agent is sufficient to produce a negative resist as a result of said exposure to ultraviolet radiation.

18. A photosensitive composition which comprises:
(1) a prepolymer produced by the process of claim 1;
(2) between about 2 and about 15 parts by weight of a vinyl comonomer for every 100 parts of total of prepolymer and comonomer said vinyl comonomer being selected from the group consisting of monomers which are solids at room temperature and liquids having high boiling points and having a very low vapor pressure at room temperature; and
(3) between about 0.01 and 3 parts by weight of a crosslinking agent for each 100 parts by weight total of prepolymer and comonomer.

19. A photosensitive composition which comprises:
(1) a prepolymer produced by the process of claim 1;
(2) between about 2 and 15 parts by weight of vinyl comonomer for every 100 parts by weight total of prepolymer and comonomer said vinyl comonomer being selected from the group consisting of monomers which are solids at room temperature and liquids having high boiling points and having a very low vapor pressure at room temperature;
(3) between about 0.01 and 3 parts by weight of a crosslinking agent for each 100 parts by weight total of a prepolymer and comonomer; and
(4) up to 10 parts by weight of a nitro-aryl compound for each 100 parts by weight of prepolymer in said composition.

20. A photosensitive composition comprising:
(1) 100 parts by weight of a prepolymer produced by the process of claim 1 from a mixture of an acyloin selected from the group consisting of benzoin, 2-methyl benzoin, 2-allyl benzoin, 2-phenyl benzoin, tertiary-butyl-benzoin, toluoin, acetoin, butyroin, 3 hydroxy-4-methyl pentanon-2, 11-hydroxy-12-keto-tetracosane, and glycollic aldehyde and purified monomer selected from the group consisting of vinyl acetate, vinyl formate, methyl methacrylate, ethyl metacrylate, methacrylic acid, ethyl acrylate, butyl methacrylate, 2-ethyl hexyl acrylate, and methyl vinyl ketone in the molar proportions of between 0.1 and 0 moles of acyloin for each 100 moles of monomer;
(2) between 3 and 15 parts by weight of a vinyl comonomer selected from the group consisting of acrylamide, methylacrylamide, methylacrylanilide, N-diphenylmethylacrylamide, N-phenyl acrylamide, N-vinyl succinimide, N-vinyl phthalimide, vinyl stearate, 4-vinyl biphenyl, N-vinyl carbazole, and vinyl hydroquinone;
(3) up to about 3 parts by weight of a crosslinking agent selected from the group consisting of glyceryl trimethacrylate, diethyl maleate, allyl anthranilate, neopentylglycoldimethacrylate, hexamethylenebisacrylamide, N,N-methylene bisacrylamide, ethylene dimethacrylate, and N,N-diallyl aniline; and
(4) up to about 10 parts by weight of a nitro-aryl compound.

21. The composition of claim 20 wherein the acyloin is benzoin, the purified monomer is vinyl acetate, the vinyl comonomer is vinyl succinimide, the crosslinking agent is N—N methylene bisacrylamide and the nitro-aryl compound is p-nitrodiphenyl.

No references cited.

NORMAN G. TORCHIN, *Primary Examiner.*

R. SMITH, *Assistant Examiner.*